United States Patent [19]

Matsumoto et al.

[11] Patent Number: 4,972,586
[45] Date of Patent: Nov. 27, 1990

[54] COVER FOR ROTARY BLADE OF POWER PRUNER

[75] Inventors: Isao Matsumoto; Tethumi Inomata, both of Mitaka, Japan

[73] Assignee: Kioritz Corporation, Tokyo, Japan

[21] Appl. No.: 372,597

[22] Filed: Jun. 28, 1989

[30] Foreign Application Priority Data

Jun. 28, 1988 [JP] Japan ................... 63-85292

[51] Int. Cl.⁵ ............ B26B 7/00; B26B 27/00; B26D 5/00; B26G 19/00
[52] U.S. Cl. ................... 30/276; 30/296.1; 83/821; 144/251 R
[58] Field of Search ......... 30/296.1, 276, 381, 30/384, 382, 383, 386, 390; 144/251 R; 83/860, 821

[56] References Cited

U.S. PATENT DOCUMENTS

| | | | |
|---|---|---|---|
| 2,730,803 | 1/1956 | Kimbal | 30/296.1 |
| 3,453,732 | 7/1969 | Wilkin | 30/296.1 |
| 3,805,639 | 4/1974 | Peter | 83/860 |
| 3,961,548 | 6/1976 | Claassen | 83/821 |
| 4,218,853 | 8/1980 | Willoughby et al. | 144/251 R |
| 4,343,115 | 8/1982 | Staabler et al. | 144/251 R |
| 4,696,108 | 9/1987 | Zerrer et al. | |

FOREIGN PATENT DOCUMENTS

| | | |
|---|---|---|
| 0117848 | 9/1984 | European Pat. Off. |
| 57-14971 | 3/1982 | Japan |
| 57-21358 | 5/1982 | Japan |
| 62-10746 | 4/1987 | Japan |

Primary Examiner—Douglas D. Watts
Assistant Examiner—Paul M. Heyrana, Sr.
Attorney, Agent, or Firm—Browdy and Neimark

[57] ABSTRACT

A cover for a rotary blade of a power pruner having a grip portion connected to a transmission shaft for transmitting the torque of an internal combustion engine, and a rotary blade for pruning being disposed at the front end of the grip portion. The rotary blade cover has a cover portion facing at least a portion of a cutting edge of the rotary blade on the side of the grip portion and partially covering the upper and lower surfaces and the outer peripheral edge of the rotary blade so as to form a cavity in which a rotary air flow is formed.

5 Claims, 1 Drawing Sheet

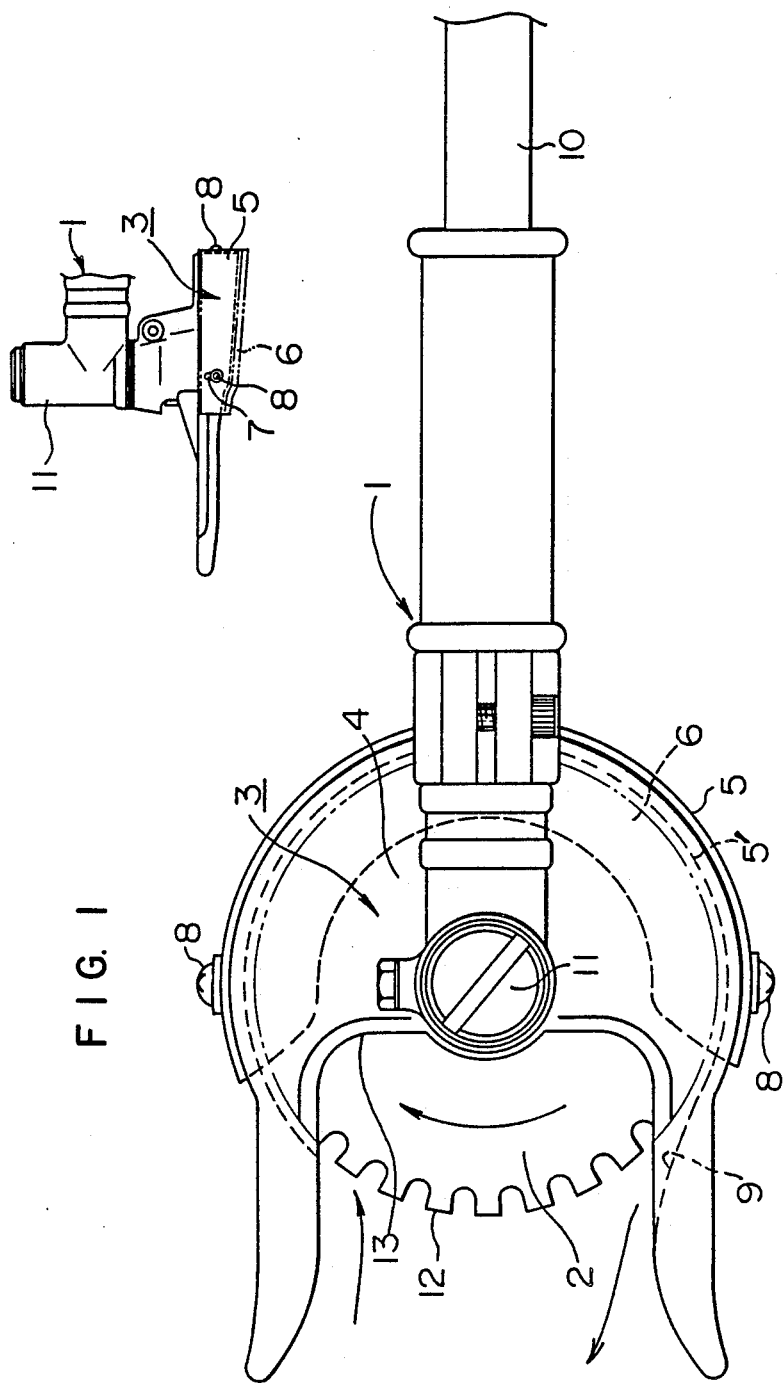

COVER FOR ROTARY BLADE OF POWER PRUNER

BACKGROUND OF THE INVENTION

This invention relates to a cover for a rotary blade of a power pruner.

Power pruners have a cover for covering part of the upper surface and part of the peripheral portion of a rotary blade. Ordinarily, this kind of conventional blade cover is designed to satisfy only the irreducible minimum necessity for safeguard of the operator. It is not capable of suitably stopping sawdust or chips produced during pruning from flying in all radial directions of the rotary blade. In particular, when the rotary blade is located above the operator's face during operation, such a cover does not prevent sawdust from flying to the operator's face.

SUMMARY OF THE INVENTION

It is therefore an object of the present invention to provide a cover for a rotary blade of a power pruner free from a problem of flying sawdust or the like in all radial directions of the rotary blade and from a problem of twigs or the like being clogged in a gap between the rotary blade and the case, the blade cover being improved in handling.

To this end, the present invention provides a cover for a rotary blade of a power pruner, comprising:

a grip portion connected to a transmission shaft for transmitting the torque of an internal combustion engine, a rotary blade for pruning being disposed at the front end of the grip portion; and a blade cover portion facing at least a portion of a cutting edge of the rotary blade on the side of the grip portion and partially covering the upper and lower surfaces and the outer peripheral edge of the rotary blade so as to form a cavity in which a rotary air flow is formed.

In this arrangement, the blade cover facing portions of the upper and lower surfaces and the peripheral ends of the rotary blade is provided on the side of the grip portion, and a rotary air flow is generated by the rotation of the rotary blade inside the cover, thereby enabling sawdust to fly only in a particular direction, e.g., in a frontward direction while preventing clogging of the dust, as well as assuring safeguard of the operator.

That is, it is possible to discharge the dust in the desired direction with the desired range only by forming a rotary air flow path along the peripheral portion of the rotary blade cutting edge. The labor hygiene of the operator and handling of the machine are thereby improved while clogging and wrapping-around of twigs are prevented.

BRIEF DESCRIPTION OF THE DRAWINGS

The accompanying drawings show a rotary blade cover of a shoulder power pruner which represents an embodiment of the present invention;

FIG. 1 is a plan view of the cover; and
FIG. 2 is a side view of the cover.

DESCRIPTION OF THE PREFERRED EMBODIMENT

An embodiment of the present invention will be described below with reference to the accompanying drawings.

The illustrated embodiment comprises a rotary blade device of a back-pack type power pruner. The rotary blade device has a grip rod 1 supported by one of the operator's hands, a flexible transmission shaft 10 which receives a torque from a power source such as a small internal combustion engine, and which is connected to one end of the grip rod 1, and a rotary blade 2 supported at the other end of the grip rod 1. The rotary blade 2 is rotated by the torque of the transmission shaft 10 transmitted through a bevel gear mechanism 11 at a predetermined speed in a predetermined direction. The rotary blade 2 is in the form of a disk and has a cutting edge 12 formed in its peripheral portion. An upper side portion 4 of a rotary blade cover 3 formed above the cutting edge 12 has a cutout portion 13 formed only on the opposite side from the grip rod 1. The cutting edge 12 is exposed for pruning through the cutout portion 13. A side wall portion 5 is formed along the outer peripheral end of the upper side portion 4, as shown in FIG. 2. A lower side portion 6 is formed integrally with the side wall portion 5 but made separately from the upper side portion 4 so as to extend within an area indicated by the broken line in FIG. 1, thereby covering the rotary blade 2 so that a rotary air flow is generated along a portion of the rotary blade 2 on the side of the grip 1 generally corresponding to a 180° circular arc of the rotary blade 2. The upper and lower side portions 4 and 6 and the side wall portion 5 thus constitute the rotary blade cover 3. An opening-side inner peripheral surface 9 of a side wall portion 5 ' downwardly bent from the upper side portion 4 extends tangentially to the peripheral edge line of the rotary blade 2, thereby facilitating discharge of sawdust. The distance between the upper and lower portions 4 and 6 can be changed by utilizing elongated holes 7 formed in the side wall portion 5 so as to control discharge of sawdust or select the branch cutting position. In this embodiment, screws 8 which screwed on the side wall portion 5' of the upper side portion 4 through the elongated holes 7 of the side wall portion 5 of the lower side portion 6 are unscrewed to enable adjustment of the distance between the upper and lower cover portions 4 and 6, and are screwed again to fix the cover portions.

Since the lower side portion 6 has shape of a horseshoe opened over the front half, there is no possibility of hitching of a bulge (papilla) of a branch to be cut in the vicinity of a trunk, and the rotary blade 2 can be moved smoothly.

What is claimed is:

1. A cover for a rotary blade of a power pruner, comprising: a grip portion connected to a transmission shaft for transmitting the torque of an internal combustion engine, a rotary blade for pruning being disposed at the front end of said grip portion; and a blade cover portion facing at least a portion of a cutting edge of said rotary blade on the side of said grip portion and partially covering the upper and lower surfaces and the outer peripheral edge of said rotary blade so as to form a cavity surrounding said portion of said cutting edge to guide air flow.

2. A cover for a rotary blade according to claim 1, wherein said blade cover portion is constituted by upper and lower portions and a side wall portion, and the distance between said upper and lower portions can be changed by screws and elongated holes arranged in said side wall portion.

3. A cover for a rotary blade of a power pruner comprising a transmission shaft for transmitting the torque of an internal combustion engine;

a grip portion connected to said transmission shaft;

a rotary blade for pruning connected through a gear means to said transmission shaft on the opposite end of said grip portion from the connection of said grip portion to said transmission shaft;

a blade cover partially covering upper and lower surfaces and periphery of said rotary blade including an upper wall portion partially covering the upper surface of said rotary blade, a first side portion extending from said upper wall portion, a lower wall portion partially covering the lower surface of said rotary blade, a second side portion extending from said lower wall portion and formed integrally with said lower wall portion, said upper wall and first side portions having a cutout portion exposing said rotary blade in a direction opposite from the connection of said rotary blade through said grip portion, one of said side portions having elongated holes in said side portion, 'screw means extending through said one of said side portions having said elongated holes and connecting with the other of said side portions allowing adjustment of distance between said wall portions to control discharge of sawdust and select branch cutting positions.

4. The cover for a rotary blade of claim 3 wherein said lower wall portion and said second side portion together form a shape of a horseshoe open at its ends and one side so as to expose a major portion of the lower surface of said rotary blade.

5. The cover for a rotary blade of claim 3 wherein said first side portion has an inner peripheral surface extending tangentially toward a peripheral edge line of said rotary blade from said cutout portion.

* * * * *